United States Patent
Liu et al.

(10) Patent No.: US 8,396,883 B2
(45) Date of Patent: Mar. 12, 2013

(54) SPATIAL QUERYING IN A DATA WAREHOUSE

(75) Inventors: Rui Liu, Beijing (CN); Qiming Chen, Cupertino, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 87 days.

(21) Appl. No.: 12/994,314

(22) PCT Filed: Jun. 23, 2008

(86) PCT No.: PCT/CN2008/071406
§ 371 (c)(1),
(2), (4) Date: Nov. 23, 2010

(87) PCT Pub. No.: WO2009/155741
PCT Pub. Date: Dec. 30, 2009

(65) Prior Publication Data
US 2011/0066617 A1    Mar. 17, 2011

(51) Int. Cl.
*G06F 7/00* (2006.01)
*G06F 17/30* (2006.01)

(52) U.S. Cl. .......................... 707/759; 707/723

(58) Field of Classification Search .................. 707/760, 707/999.04, 759, 723
See application file for complete search history.

(56) References Cited

U.S. PATENT DOCUMENTS

| | | | |
|---|---|---|---|
| 6,016,499 A | | 1/2000 | Ferguson |
| 6,278,994 B1 * | | 8/2001 | Fuh et al. ............................ 1/1 |
| 2006/0155679 A1 | | 7/2006 | Kothuri et al. |
| 2006/0190434 A1 * | | 8/2006 | Dettinger et al. ................. 707/3 |
| 2007/0208721 A1 * | | 9/2007 | Zaman et al. ..................... 707/4 |
| 2007/0250478 A1 * | | 10/2007 | Copperman ..................... 707/3 |
| 2008/0077570 A1 * | | 3/2008 | Tang et al. ....................... 707/5 |
| 2008/0097966 A1 * | | 4/2008 | Choi et al. ....................... 707/3 |
| 2008/0120322 A1 * | | 5/2008 | Liu et al. ....................... 707/102 |
| 2010/0332526 A1 * | | 12/2010 | Nori et al. ..................... 707/769 |

FOREIGN PATENT DOCUMENTS

| CN | 101137957 | 3/2008 |
|---|---|---|
| EP | 1826691 | 8/2007 |

OTHER PUBLICATIONS

International Search Report and Written Opinion for PCT/CN2008/071406, Feb. 25, 2009.

* cited by examiner

*Primary Examiner* — Cam Truong

(57) ABSTRACT

A data warehouse that operates to receive a spatial query and return a spatial result for the spatial query, the data warehouse comprises a regular database operating to receive and process a regular query and return a query result in response to the regular query. The data warehouse also comprises an interface layer implemented external to the regular database and operating to intercept the spatial query and translate the spatial query into the regular query for processing by the regular database. The regular database includes at least one spatial index that is accessed by the interface layer to translate the spatial query into the regular query for processing by the regular database.

14 Claims, 5 Drawing Sheets

SPATIAL QUERYING IN A DATA WAREHOUSE

CLAIM FOR PRIORIY

The present application is a national stage filing under 35 U.S.C 371 of PCT application number PCT/CN2008/071406, having an international filing date of Jun. 23, 2008, which is incorporated by reference in its entirety.

BACKGROUND

Many enterprises, such as companies, corporations, and organizations are creating and deploying data warehouses to service their data collection and retrieval needs. As referred herein, a data warehouse is a database, data storage, or data repository that includes one or more electrical or electronic data storage devices such as computers, servers, computerized databases such as database management systems (DBMS'es), and the like. As known in the art, a data warehouse supports software applications with tremendous reliability, scalability, functionality, and availability. In turn, applications therein are constantly calling for new capabilities from data warehouses and databases therein. For example, emergent applications for automated mapping, facilities management, geographic information system (GIS), wireless location services, and location-aware e-businesses all desire databases to handle the generation, storage, and analysis of geographic features (e.g., geographic locations and/or regions). Typically these geographic features are stored as spatial or geometry data in databases. Thus, it is desirable for these databases to handle location- or geometry-based queries of spatial data and other spatial functions, raising further demands for efficient multidimensional indexing and partitioning technologies. Hereinafter, the term "geometry" and "spatial" are used interchangeably.

There exist solutions for handling spatial data types and functions and accessing spatial data in a database system. However, these solutions are implemented within the database system through the addition of new system modules or extensions. If more and more domain-specific modules (or extensions) are inserted into the database system to add domain-specific functionalities, they may create complications to other components in the database system. For example, internalizing these new modules in a database system may interfere with typical components that already exist therein, such as the query optimizer, the statistic generator, and the executor. Furthermore, conventional domain-specific modules are designed and implemented for a specific database system, and they are not typically supported by parallel databases. Thus, it may not be possible to port these modules between different database systems, particularly, parallel database systems, so as to re-use them instead of creating new ones for each different database system.

Accordingly, there is a desire to enhance data warehouses with spatial extensions to handle and support spatial data types and functions in order to provide effective data warehouses with added capabilities such as scalability and interoperability.

BRIEF DESCRIPTION OF THE DRAWINGS

Embodiments are illustrated by way of example and not limited in the following figure(s), in which like numerals indicate like elements, in which.

DETAILED DESCRIPTION

Figure 1A:
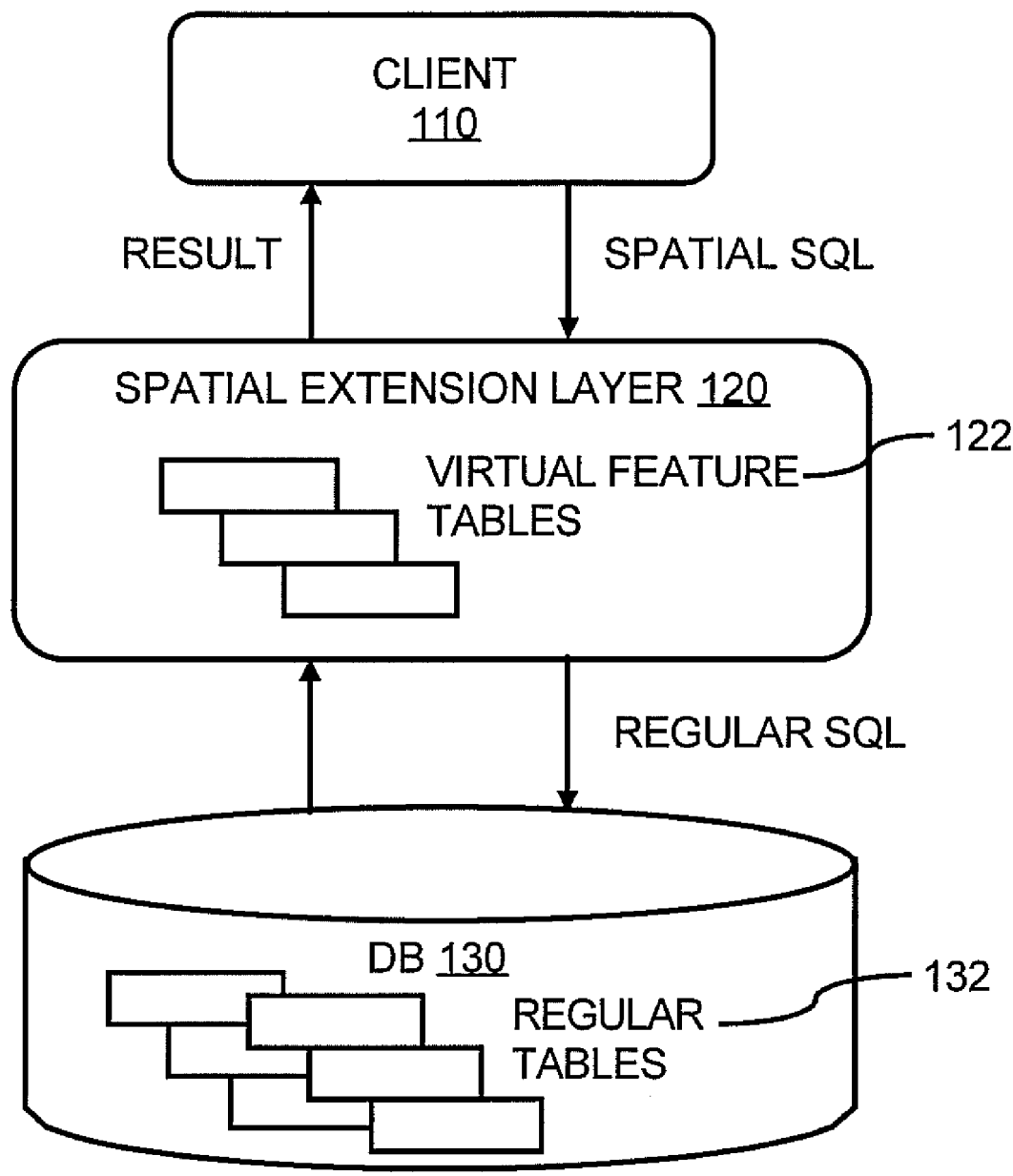
FIG. 1A illustrates a logical architecture of an environment in which a spatial extension layer may operate, in accordance with one embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are systems and methods for a spatial extension layer (SEL) to handle geometric data types, spatial indices, spatial relations, spatial operators, and spatial queries in a data warehouse, such as an enterprise data warehouse (EDW), wherein the EDW may include a relational and/or parallel database system (e.g., DBMS). According to various embodiments, the SEL is an interface layer that is operable to help the EDW understand spatial data types therein and perform various spatial operations through query rewriting and user-defined functions. In one embodiment, the SEL enhances spatial querying efficiency with two-phase indexing/filtering and leaves much space for complicated spatial processing with functions provided outside the EDW. Besides its capability of balancing performance and robustness, the SEL also enables spatial indexing and spatial query processing for parallel databases, whereby the spatial index and spatial data are partitioned onto data nodes with locality to achieve better performance.

In one embodiment, the SEL provides a way to add new functionalities to handle spatial data types and functions by adding new modules to a database system, such as the EDW, without intrusive effects to such a system. Additionally, domain-specific functionalities provided by these new modules are easily portable so that the modules are reusable between different database systems. In another embodiment, the SEL is operable to handle new data types on its virtual layer without requiring the underlying database engine to support user-defined type. Furthermore, the SEL is also operable to add multidimensional index without modifying the database core.

Domain-specific data management functionalities are provided on top of the database system in the SEL in a way that operations are pushed down to the database system without intrusive effect on the database core engine. Thus, flexibility for further extensions is retained. In one embodiment, the SEL rewrites spatial queries into regular queries, which are then executed by the underlying database. Such operation push-down avoids large amount of data transfer between the database system and the SEL because spatial functions are pushed down from the SEL to the database system as user defined functions (UDFs), which are then executed or run inside the database system. Thus, the input data to the resulting UDFs does not migrate outside of the database system, and only query results are pushed up to the SEL to be translated back. Without the push-down of the UDFs, huge volume of input data will have to be transferred out from the database system for the spatial functions to execute. In one embodiment, queries are rewritten to be executed in two stages: filter and refinement. In the filter stage, the SEL reduces the query data to be fed to the more computation intensive processing in the refinement stage.

The SEL also makes use of the "operational environment" of the database system to deal with query planning, optimization, index locking, garbage collection, buffering, etc., instead of duplicating them in the SEL. While the SEL spatial supports operations inside the database engine, which minimizes data transfer, it is also operable to provide functions outside because it is external to the database system. Consequently, it provides an opportunity to fulfill more complex computations.

FIG. 1A illustrates a logical architecture of an environment 100 in which a SEL may operate, in accordance with one embodiment. As illustrated, a SEL 120 is implemented external to and on top of a data warehouse, such as a database 130, to provide an interface between a client 110 and the underlying database 130. In another embodiment, the SEL 120 may be implemented as a middleware between the client 110 and the underlying database 130. The SEL 120 includes one or more virtual feature tables (VFTs) 122 that are operable to transparently support new user-defined data types, such as spatial data types, in the database 130 without relying on the database 130 itself to support such user-defined data types. Each VFT may be created by one or more users, such as database users, per their design. The VFT is "virtual" in that it is not physically stored inside the database 130. Therefore, the SEL 120 is flexible and scalable, and it may be applied to a wide range of database systems.

In operation, the SEL 120 intercepts a client's spatial query and/or operation and maps it against the virtual feature tables 122.

If the intercepted query/operation is a spatial query/operation such as a spatial Structured Query Language (SQL), which involves geometric data types and functions, the SEL 120 translates it using the virtual feature tables 122, into regular or non-spatial SQL statements that refer to regular data types/operators on the regular tables 132 in the underlying database 130.

The query/operator results from the regular tables are then reorganized and translated back into geometric data types as answers or responses to the original spatial query. From the perspective of the client(s) 110, queries and operations are applied as if the virtual feature tables are physically stored in the database 130. Non-spatial queries and operations are passed through to regular tables without any intervention from the SEL 120.

Figure 1B:
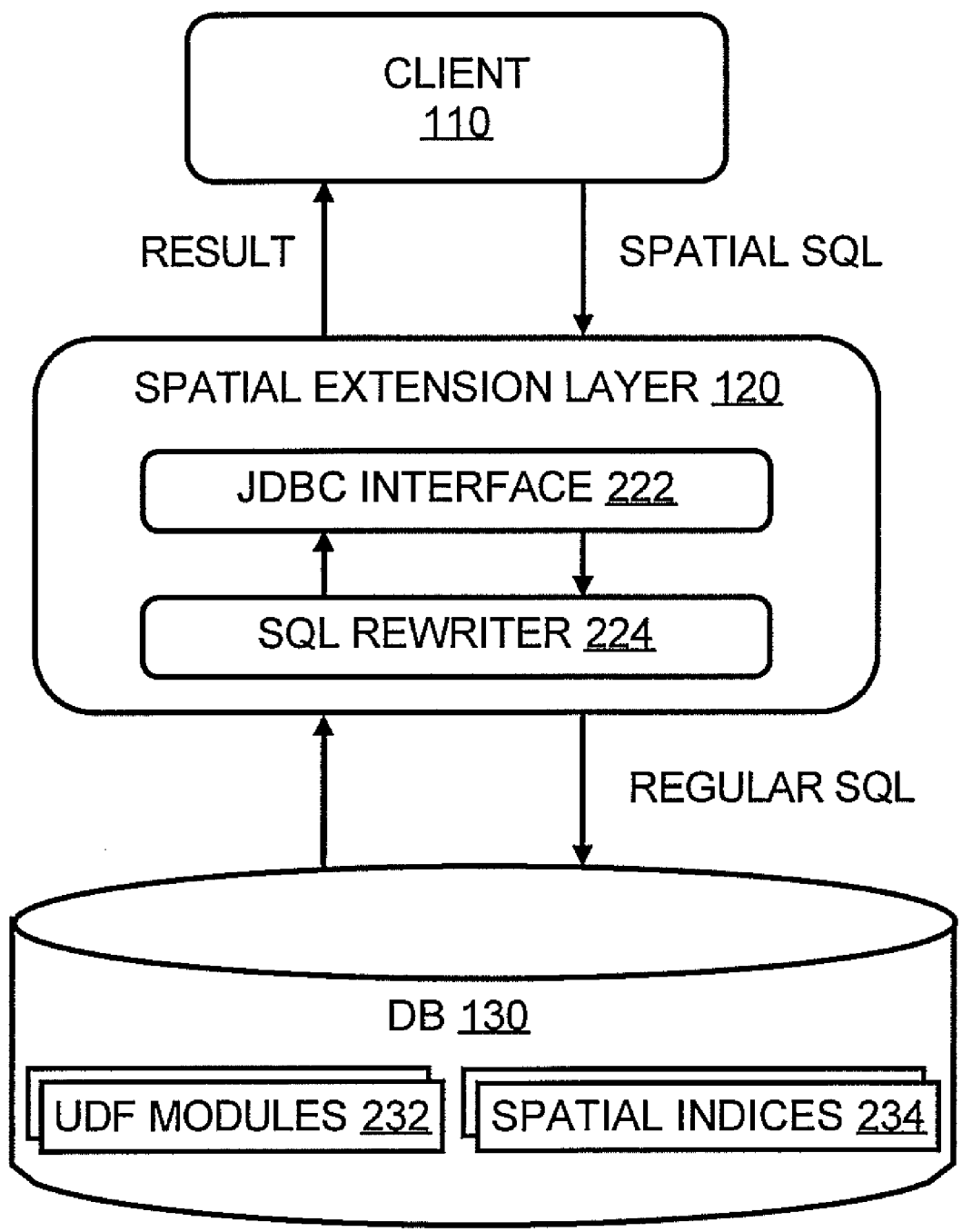
FIG. 1B illustrates a component view of the environment illustrated in FIG. 1A.

FIG. 1B illustrates a component view of the environment 100. In one embodiment, the SEL 120 provides an application programming interface (API) 222 for the client(s) 110 to submit spatial queries to and receive answers from the database 130. For example, as illustrated, the API 222 may be a Java™ database connectivity (JDBC) API for a JDBC client 110 to interface with the database 130. The SEL 120 also includes a database language rewriter or translator 224 that serves as the core module in the SEL 120 to translate spatial queries into regular queries. For example, the database language rewriter 224 may be a SQL rewriter that is operable to translate spatial queries into regular SQL statements that is understood by the database 130.

To perform the aforementioned rewrite or translation, the rewriter 224 performs three types of mapping or translation: 1) VFTs to regular tables, 2) spatial or geometry data types to regular data types, and 3) spatial/geometry query functions to user-defined query functions (UDFs). The rewriter 224 also divides spatial queries into two phases: filtering and refinement. Both the API 222 and database-language (or SQL) rewriter 224 may be implemented as software modules in the SEL 120. The VFTs 122 provide a logical view of geometric features. Each VFT includes a mapping of standard geometry data types (hereinafter "geometry types"), such as those specified by the Open Geospatial Consortium (OGC), to regular data types that are typically found in a regular database, such as the database 130. To that extent, each VFT 122 corresponds to a feature table and a geometry table, which are the regular tables 132 illustrated in FIG. 1A, in the underlying database 130. Each geometric feature is represented as an integer ID in the feature table, and its geometry is stored in the geometry table as a Binary Large Object (BLOB) that conform to a Well-Known Binary or Text (WKB or WKT) format for representing geometry objects as regular data in a regular database with the above integer ID as its key or pointer.

Accordingly, a spatial query (e.g., a spatial SQL statement) that includes geometry or spatial data types and functions to the VFTs is rewritten to one or more regular queries (e.g., regular SQL statements) against the corresponding regular tables (e.g., the feature and geometry tables). In one embodiment, for enhanced performance, unary geometry/spatial functions (i.e., single-variable geometric functions) such as length( ) and area( ) may be pre-computed as materialized attribute values for direct access via the VFTs rather than implemented as UDFs. These functions are referred to as zero-latency functions.

As illustrated in FIG. 1B, the database 130 includes one or more User Defined Function (UDF) modules 232 and one or more spatial indices 234. The UDF modules 232 provide the UDFs that correspond to the spatial functions in the spatial query that are pushed down to the database 130 from the SEL 120. These UDFs are predefined in database 130, to correspond to spatial functions that are desired to be supported by the SEL. The spatial indices 234 index the geometry tables using the integer IDs from the feature tables.

Figure 2:
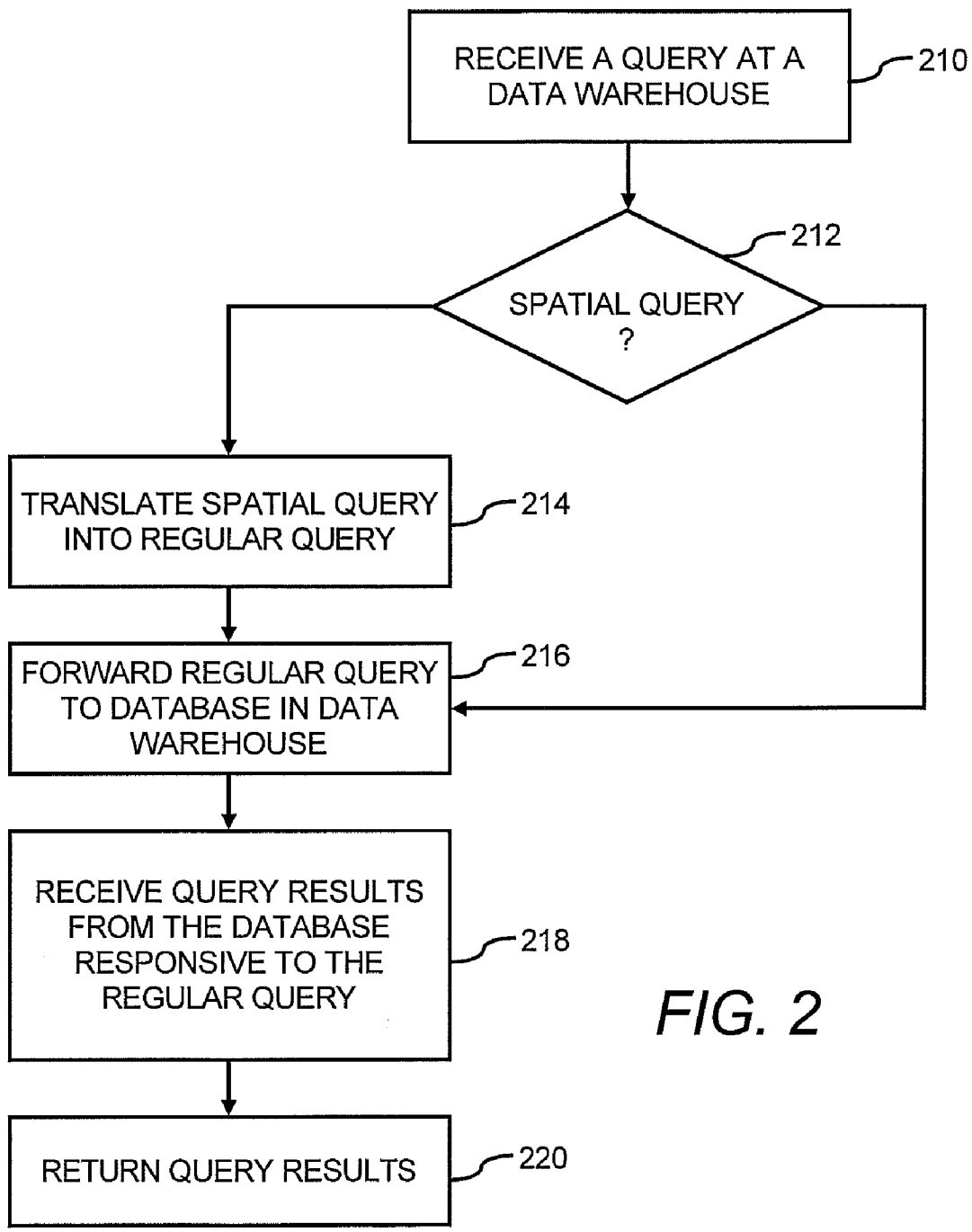
FIG. 2 illustrates a process for using a spatial extension layer external to a non-spatial or regular database to process spatial queries.

FIG. 2 illustrates a process 200 for using a SEL external to a non-spatial database in order to enable such a database to effectively process spatial queries, in accordance with one embodiment. For illustrative purposes only and not to be limiting thereof, FIG. 2 is described with reference to the environment 100 shown in FIGS. 1A-B.

At 210, a query is received at a data warehouse, which may be maintained by a provider of spatial data solutions. The query may include, for example, one or more spatial SQL statements. The query is initiated at a client, such as a JDBC client 110, that is provided with access to the data warehouse, via a direct connection to the data warehouse or a data network such as a private or public data network (e.g., an intranet or Internet). The data warehouse includes a regular database 130 having a SEL 120 thereon that provides an interface between the client 110 and the database 130.

At 212, the query is intercepted by the SEL 120, which compares it against one or more VFTs therein to determine whether the query is a regular query (i.e., a non-spatial query) or a spatial query. The SEL 120 achieves this determination by determining whether the query includes spatial data types as listed in the one or more VFTs. If the SEL 120 determines that the intercepted query is a non-spatial query, it passes the query through to the database 130 for processing, as further described below at 216.

At 214, however, if the SEL 120 determines that the intercepted query is a spatial query, it proceeds to rewrite or translates the spatial query into a regular query having regular database query language, such as regular SQL statements, that refer to regular data types and functions on regular tables (e.g., the feature tables and geometry tables) in the database 130. As referred herein, a regular data type is a non-spatial data type that is typically employed in a regular (i.e., non-spatial) database system, such as a regular DBMS. This rewrite process is further detailed later.

At 216, the SEL 120 provides, sends, or forwards the translated regular SQL statements to the database 130 for normal database processing to retrieve the geometric data stored in the geometry tables as query results. That is, the generated regular query is processed as is typically performed in a regular (non-spatial) database, such as the database 130, to process and generate query results from the regular tables in the database 130, namely, the feature tables and their corresponding geometry tables.

At 218, the SEL 120 receives the query results, which are spatial query results given in regular data types, so as to send them back to the client 110 as answers to the original spatial query.

At 220, the SEL 120 returns the query results as answers to the original query to the JDBC client 110.

The SEL 120 rewrites spatial queries using a rewriter module, such as the SQL rewriter 234. As noted earlier, the SQL rewriter 234 rewrites a spatial query by mapping VFTs to regular tables, spatial data types to regular data types, and spatial functions to UDFs. Evaluating spatial functions in spatial queries may be costly in terms of computation. Thus, to improve efficiency, spatial queries are processed in two phases: filtering and refinement. In the first filtering phase, the set of spatial-function candidates identified in a spatial query is trimmed through relatively inexpensive computations. In the second refinement phase, relatively more expensive computations are performed on the trimmed-down subset of spatial functions.

The SEL 120 achieves the aforementioned filtering-refinement processing with spatial indices, which are index tables for geometric features and manipulates them with regular SQL statements. These index tables form the feature tables in the database 130. In one embodiment, multiple spatial indexing methods are supported for spatial or geometry-oriented queries. For example, R-tree indexing is used to index non-zero-size geometric features (e.g., polygon, line, circle) and quad-tree indexing is used to index zero-size or point-oriented geometric features.

The spatial indexing methods are selected and implemented in the SEL 120, i.e., external to the database 130. The resulting index tables are then stored as spatial indices 234 in the database 130 and manipulated by regular SQL statements received from the SEL 120. Thus, specific locking and garbage collection need not be implemented in the SEL 120 to maintain these spatial indices. The SEL 120 also retains the ability to leverage any database indexing scheme or method (e.g., B-tree) that is provided and implemented by the database 130. For example, through spatial indexing, each two-dimensional value pair (e.g., <longitude, latitude>) of a point-oriented geometric feature is associated with a unique one dimensional value (e.g., an integer ID) that is stored in a feature table. This feature table is further refined using a database indexing scheme, such as a B-tree index, to store the associated geometric features in the corresponding geometric table. Accordingly, the spatial indexing is combined into the query rewrite by the SQL rewriter 224. That is, the SQL rewriter 224 rewrites the spatial query and the indexing query associated with it (i.e., the query against the corresponding spatial index) into a single query, e.g., a regular SQL statement, to the underlying database 130.

Figure 3:
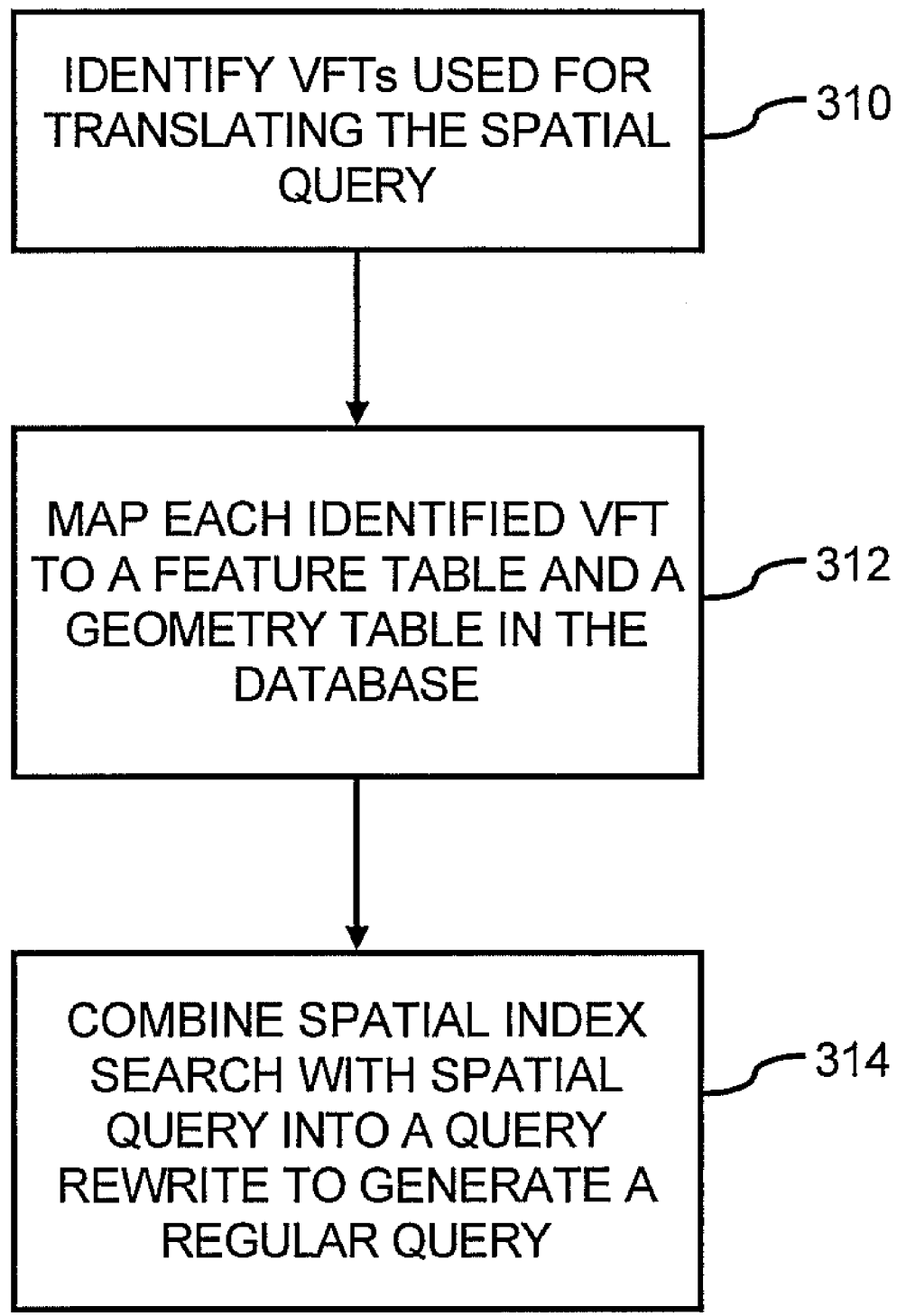
FIG. 3 illustrates a process of translating a spatial query into a regular query for processing by a regular database.

The rewrite process at 214, as performed by the SEL 120, to rewrite a spatial query to a regular query is now described with reference to FIG. 3. Again, for illustrative purposes only and not to be limiting thereof, FIG. 3 is described with reference to the environment 100 shown in FIGS. 1A-B.

At 310, the spatial query, which is intercepted by the SEL 120, is compared against the available VFT(s) in the SEL 120 to identify one or more VFTs that provide information about the geometry data type of the geometry/spatial feature(s) found in the spatial query for translation. Each geometry feature is associated with a geometry identification (ID), such as an integer ID, and a geometry data type in a VFT.

At 312, each identified VFT is mapped to a corresponding feature table in the database 130 that maintains an integer ID associated with a geometry feature. The integer ID also serves as a key to identify an associated geometry table that provides regular data and data type corresponding to the integer ID and, therefore, describing the associated geometry feature and its spatial data type in the spatial query. Thus, each identified VFT is mapped to corresponding regular tables in the database 130, namely, a feature table and a geometry table, there is a mapping spatial data types to regular data types. For each feature table, there is a spatial index. The search of the spatial index is implemented as part of the regular query, that is generated by SQL rewriter 224. This spatial-index search provides an initial filtering phase in a two-phase process of filtering and refinement for processing spatial queries as described earlier. In addition, existing non-spatial indexing (e.g., B-tree indexing) as provided by the database 130 may be leveraged to index the integer IDs in the feature table.

At 314, the spatial-index search or query against the spatial index is combined with the spatial query into a query rewrite to generate a single regular query, such as regular SQL statement, in the underlying database 130. At this point, not only the VFTs are mapped to regular tables and spatial data types are mapped to regular data types as noted above, but spatial functions or operations are pushed-down and implemented as user defined functions (UDFs) in the database 130. This is the refinement phase of the two-phase processing of spatial queries.

In one embodiment, the database 130 is a parallel database, such as a parallel DBMS, that includes multiple processors for paralleling processing of database functions, such as database queries. Thus, the spatial index in each feature table (i.e., index table) may be range-hash partitioned for enhanced performance through parallel processing. Thus, the SEL 120 introduces a locality approach for co-partitioning data and indices in a non-spatial parallel database environment as explained below.

In a spatial index tree, such as one maintained in each feature table, each tree level corresponds to a partition level. Every node ID, which is the geometry or integer ID, at a chosen level is used as a partition key for its sub-tree. Partition keys are stored in both the feature tables and the geometry data tables. Thus, data and indices from the same sub-tree have the same partition key and are hashed to automatically be placed in the same storage node. Furthermore, below a predetermined partition level, node IDs in a predetermined numerical range are co-located in the same storage node. The co-partitioning of data and indices may efficiently reduce data transfer and improve query performance dramatically.

Figure 4:
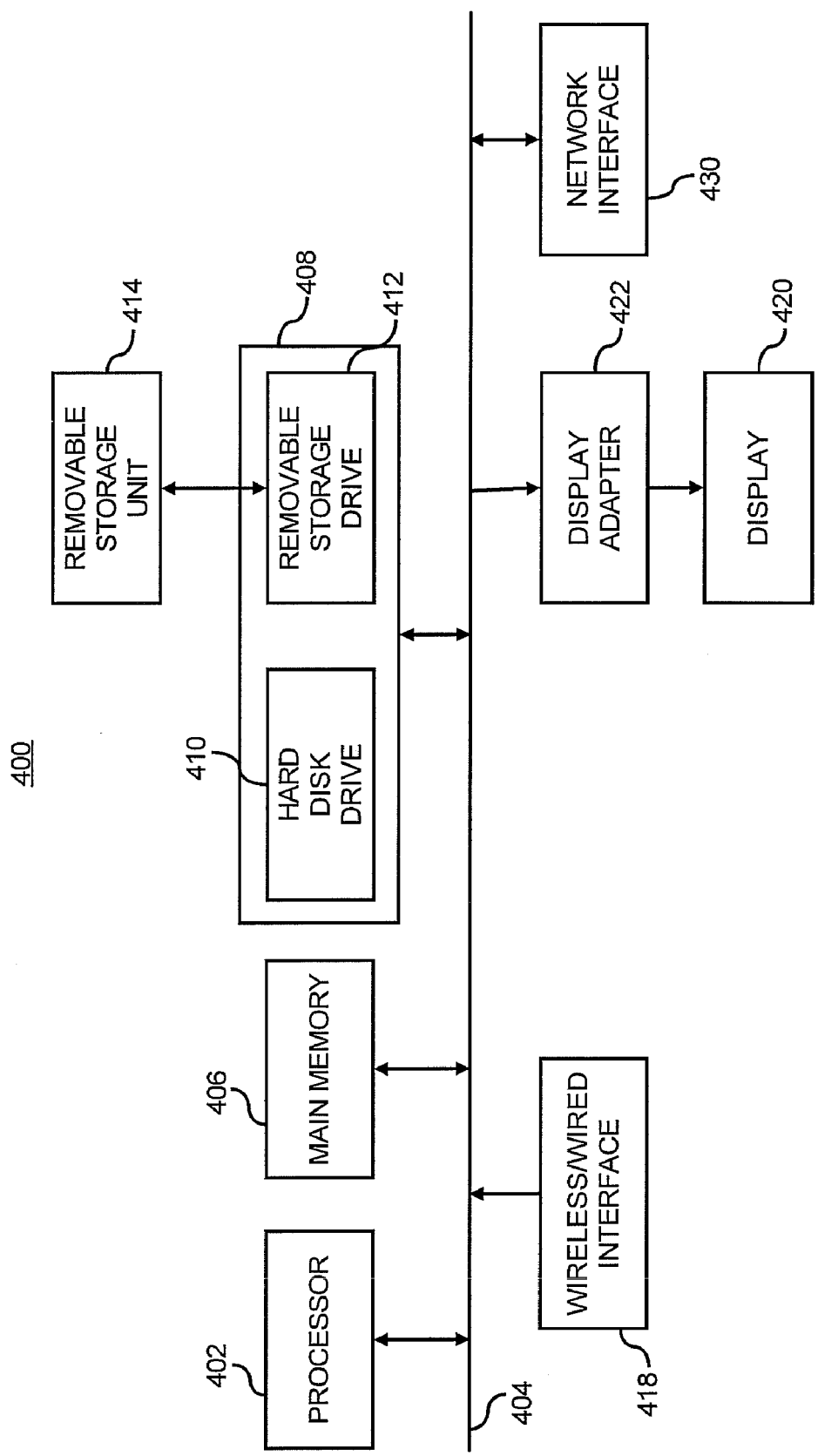
FIG. 4 illustrates a block diagram of a computerized system that is operable to be used as a computing platform for a spatial extension layer or a regular database.

FIG. 4 illustrates a block diagram of a computerized system 400 that is operable to be used as a computing platform for implementing the SEL 120 and the regular database 130 described above. The computerized system 400 includes one or more processors, such as processor 402, providing an execution platform for executing software. In the case of the regular database 130 being parallel database, multiple processors are included therein to provide multiple processing nodes. Thus, the computerized system 400 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor(s) 402 are communicated over a communication bus 404 or through point-to-point links with other components in the computerized system 400.

The computerized system 400 also includes a main memory 406 where software is resident during runtime, and a secondary memory 408. The secondary memory 408 may also be a computer-readable medium (CRM) that may be used to store regular tables 132, including the UDF software modules 232 and spatial indices 234, in the regular database 130 when the computerized system 400 is used as a platform for the regular database 130. The secondary memory 408 may also be a CRM that may be used to store software modules for implementing the SEL 120 when another computerized system 400 is used as a platform for the SEL 120. The main memory 406 and secondary memory 408 (and an optional removable storage unit 414) each includes, for example, a hard disk drive and/or a removable storage drive 412 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions.

The computerized system 400 includes a display 420 connected via a display adapter 422, user interfaces comprising one or more input devices 418, such as a keyboard, a mouse, a stylus, and the like. The display 420 provides a display component for displaying, for example, a graphical user interface (GUI) for users to input spatial queries and receive corresponding query results. However, the input devices 418 and the display 420 are optional. A network interface 430 is provided for communicating with other computerized systems via, for example, a network such as the Internet to provide users with access to database of image tiles.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for providing spatial querying in a data warehouse, comprising:

receiving a query at the data warehouse; determining whether the query is a spatial query; and upon determining that the query is a spatial query, a) translating the spatial query into a regular query; b) providing the regular query to a regular database of the data warehouse, wherein translating the spatial query into the regular query comprises: mapping a virtual feature table (VFT) to regular tables, wherein the VFT includes at least one spatial data type found in the spatial query, and the regular tables include at least one regular data type that corresponds with the at least one spatial data type in the VFT;

c) receiving at least one regular result from the regular database in response to the regular query; and d) returning at least one spatial-query result as an answer to the query received at the data warehouse, wherein the returning the at least one spatial-query result comprises reorganizing and translating the answer into a geometric data type.

2. The method of claim 1, wherein translating the spatial query into a regular query further comprises: mapping the at least one spatial data type to the corresponding at least one regular data type.

3. The method of claim 2, wherein translating the spatial query into a regular query further comprises:

implementing at least one spatial query function found in the spatial query as at least one user-defined query function.

4. The method of claim 1, further comprising:

pre-computing a unary spatial function found in the spatial query to a regular data type in the regular tables.

5. The method of claim 4, wherein translating the spatial query into a regular query further comprises:

mapping the unary spatial function to a regular data type in the regular tables.

6. The method of claim 2, wherein mapping the at least one spatial data type to the corresponding at least one regular data type comprises:

performing an index search based on an indexing technique used by the regular database to retrieve the corresponding at least one regular data type.

7. The method of claim 2, wherein mapping the at least one spatial data type to the corresponding at least one regular data type comprises:

performing a spatial-index search in the regular tables to retrieve the corresponding at least one regular data type.

8. The method of claim 7, wherein the regular database is a parallel database, and the method further comprising:

range-hash partitioning data and spatial indices in the regular tables for storage in the parallel database.

9. The method of claim 7, wherein translating the spatial query into a regular query further comprises:

combining the spatial query and the spatial-index search into a query rewrite to generate the regular query.

10. A data warehouse that includes a non-transitory computer readable medium on which is encoded computer programming code executed by a computer processor to receive a spatial query and return a spatial result for the spatial query, the data warehouse comprises:

a regular database operating to receive and process a regular query and return a query result in response to the regular query; and an interface layer implemented external to the regular database and operating to intercept the spatial query and translate the spatial query into the regular query for processing by the regular database, wherein the translating the spatial query into the regular query comprises:

mapping a virtual feature table (VFT) to regular tables, wherein the VFT includes at least one spatial data type found in the spatial query, and the regular tables include at least one regular data type that corresponds with the at least one spatial data type in the VFT;

wherein the regular database includes at least one spatial index that is accessed by the interface layer to translate the spatial query into the regular query for processing by the regular database and wherein the interface layer organizes and translates the query result into a geometric data type if the query result was from the intercepted spatial query.

11. The data warehouse of claim 10, wherein the interface layer further operating to receive the query result from the regular database and return the query result as an answer to the spatial query, wherein the query result is given in regular data types.

12. The data warehouse of claim 10, wherein the interface layer comprises a plurality of virtual feature tables (VFTs), each including one or more geometry types for use to compare against the spatial query to determine which one or more of the VFTs is used to translate the spatial query into the regular query based on one or more geometry types found in the spatial query.

13. The data warehouse of claim 10, wherein the regular database is a parallel database that provides a partitioning of regular data for use to provide the regular result and index data of the spatial index such that each portion of the regular data and said each portion's corresponding index data is partition to a same node in the parallel database.

14. A non-transitory computer readable medium on which is encoded computer programming code executed by a computer processor to:

receive a query at a data warehouse;
determine whether the query is a spatial query; and upon determining that the query is a spatial query,
  a) translate the spatial query into a regular query, wherein translating the spatial query into the regular query comprises: mapping a virtual feature table (VFT) to regular tables, wherein the VFT includes at least one spatial data type found in the spatial query, and the regular tables include at least one regular data type that corresponds with the at least one spatial data type in the VFT;
  b) provide the regular query to a regular database of the data warehouse;
  c) receive at least one regular result from the regular database in response to the regular query; and
  d) return at least one spatial result as an answer to the query received at the data warehouse, wherein the returning the at least one spatial result comprises reorganizing and translating the answer into a geometric data type.

* * * * *